United States Patent
Kuriuzawa et al.

(10) Patent No.: US 6,697,310 B1
(45) Date of Patent: Feb. 24, 2004

(54) STORAGE APPARATUS AND CALIBRATING METHOD

(75) Inventors: Toshio Kuriuzawa, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 487 days.

(21) Appl. No.: 09/714,393

(22) Filed: Nov. 16, 2000

(30) Foreign Application Priority Data

May 12, 2000 (JP) ........................................ 2000-139792

(51) Int. Cl.[7] .................................................. G11B 7/00
(52) U.S. Cl. .................. 369/53.11; 369/47.1; 369/53.1; 369/53.42; 369/116
(58) Field of Search ........................... 369/44.27, 44.29, 369/47.39, 47.52, 47.55, 53.11, 53.18, 53.37, 53.45, 47.1, 53.1, 53.42

(56) References Cited

U.S. PATENT DOCUMENTS 4,675,748 A * 6/1987 Masaki ..................... 369/47.3

5,796,704 A * 8/1998 Nanba et al. ............. 369/53.12

FOREIGN PATENT DOCUMENTS

| JP | 06-68615 | 3/1994 |
| JP | 07-192409 | 7/1995 |
| JP | 08-007381 | 1/1996 |
| JP | 08-106735 | 4/1996 |
| JP | 2000-105972 | 4/2000 |

* cited by examiner

Primary Examiner—Doris H. To
Assistant Examiner—Jorge L. Ortiz-Criado
(74) Attorney, Agent, or Firm—Greer, Burns & Crain, Ltd.

(57) ABSTRACT

A calibration processing unit executes a calibration when calibration operative conditions are satisfied. Irrespective of satisfaction of the calibration operative conditions during the processing of sequential data, a calibration invalidation unit temporarily invalidates the execution of the calibration and permits the execution thereof after termination of the sequential data processing. Upon the occurrence of an error, an error recovery unit makes a recovery for canceling the error and then a retry, allowing the execution of the calibration when the error recovery is normally terminated. If the sequential data processing is in process at that time, then the execution of the calibration is temporarily invalidated.

14 Claims, 13 Drawing Sheets

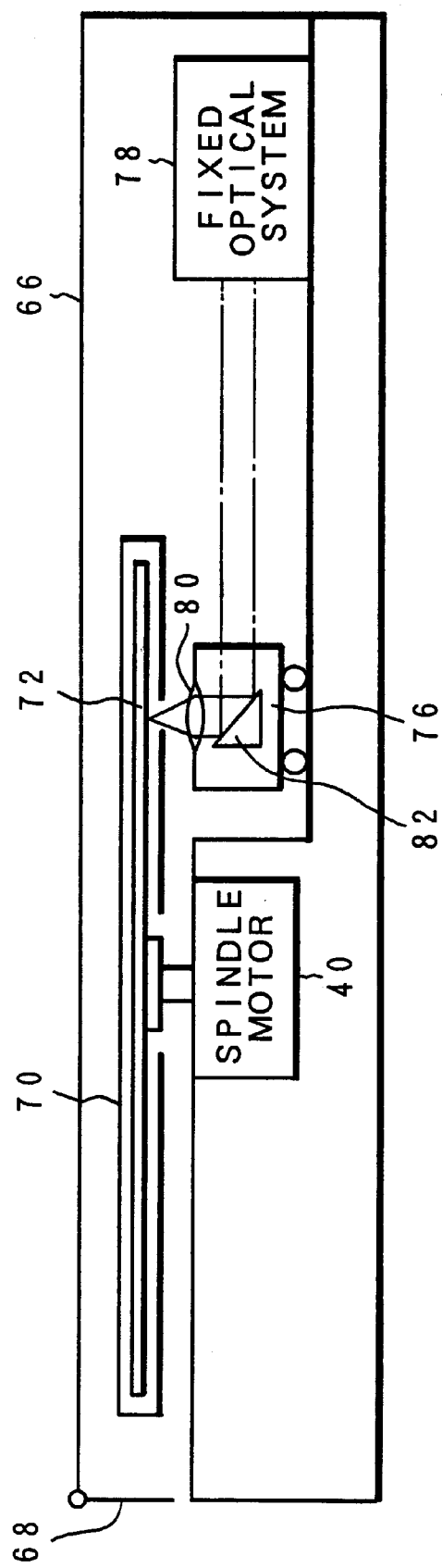

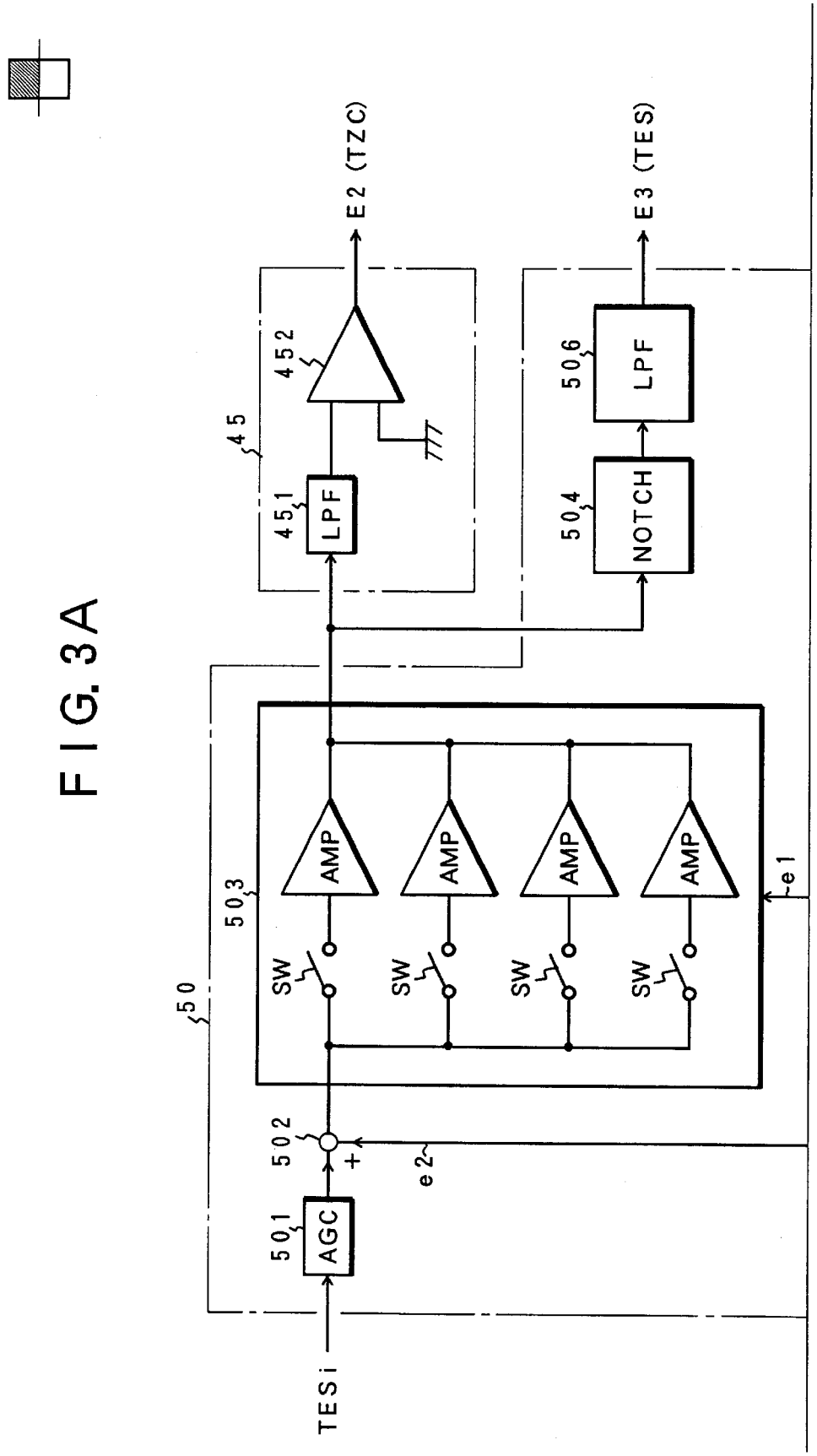

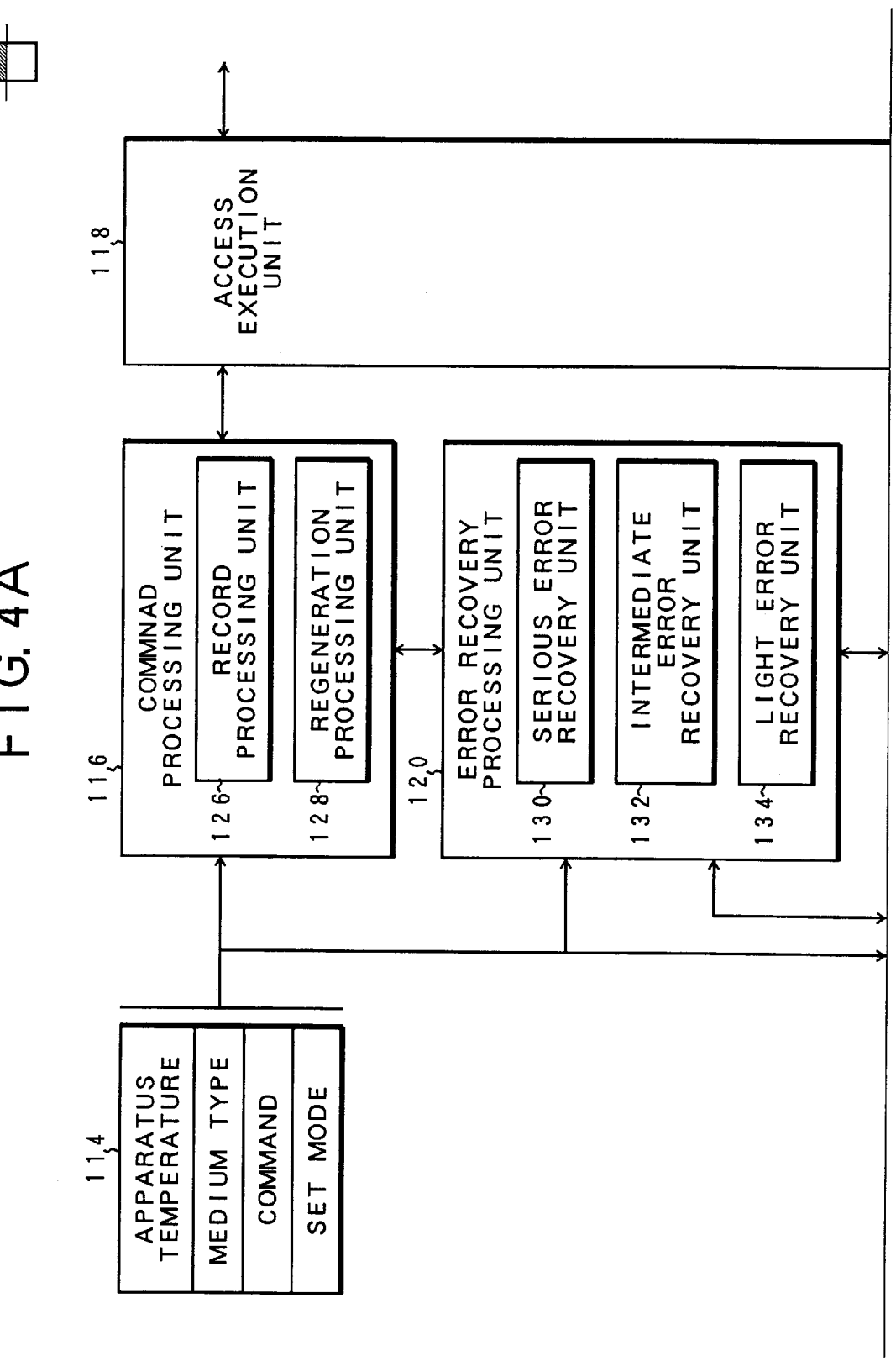

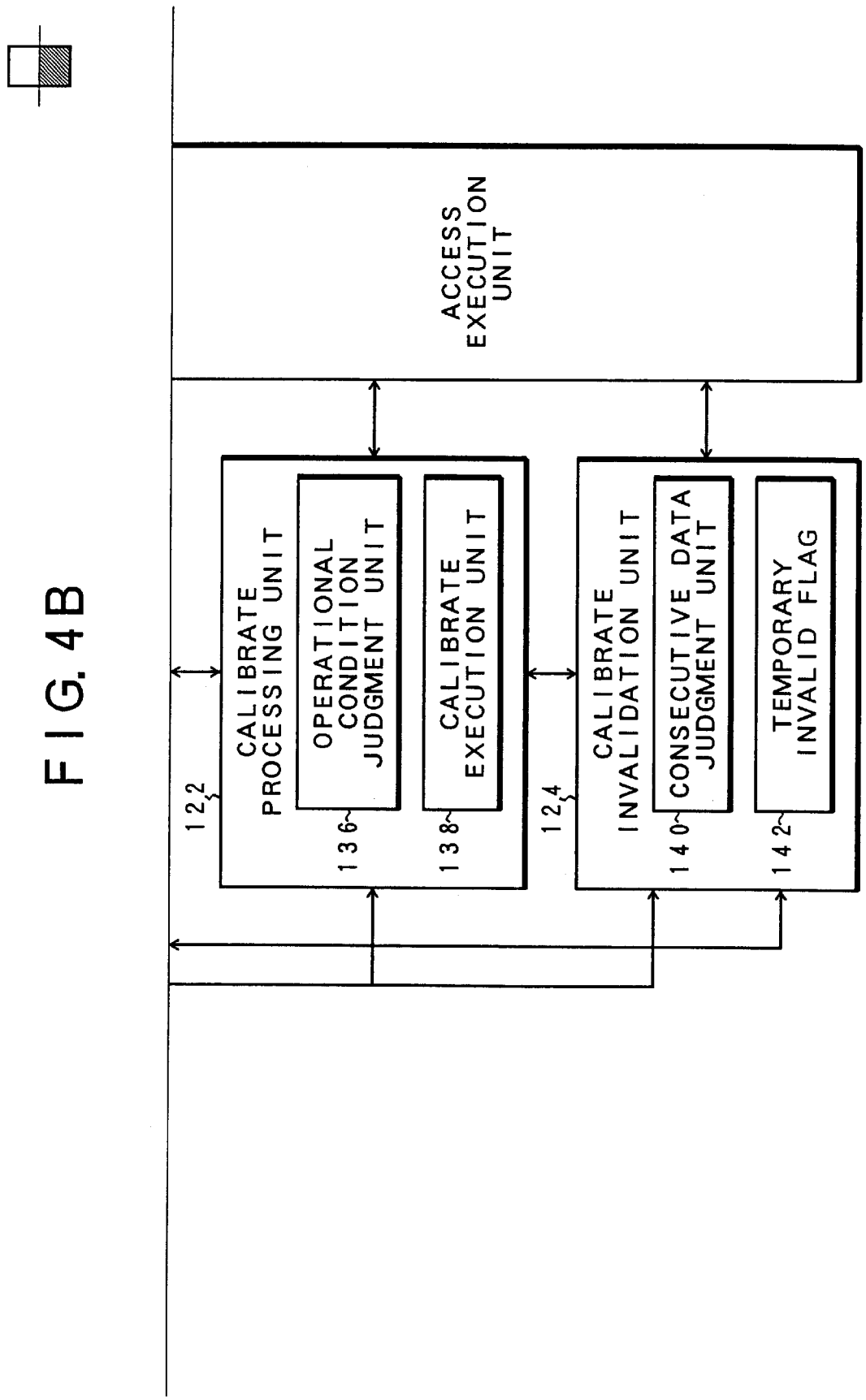

STORAGE APPARATUS AND CALIBRATING METHOD

BACKGROUND OF THE INVENTION

1. Field of the Invention

The present invention relates generally to a storage apparatus and a calibrating method therefor, arranged to perform information recording on and regeneration from a medium, and more particularly, to a storage apparatus and a calibrating method therefor, capable of suitably processing a request for calibration which may be made during the recording and regeneration of sequential data.

2. Description of the Related Arts

Known optical storage apparatuses perform information recording and regeneration by use of optical disk storage media such as magneto-optical disks (MD, MO), phase-change type optical disks (PD), hard disks and compact disks (CD, CD-R, CD-RW). Such optical storage apparatuses serve as computer external storage devices for recording the ordinary computer data, computer-executable programs, etc. Recently, however, computers tend to handle sequential data such as acoustic data and animation data in the form of time-sequentially continuous data streams. The optical storage apparatuses are effective ones sufficient to repeatedly record and regenerate such mass sequential data that attach importance to the lasting transfer speed. The conventional optical storage apparatuses judge calibration operative conditions on the basis of various variation factors such as time-sequential variances or temperature variances and further of statistical information such as past seek error count. When the operative conditions are satisfied, the optical storage apparatuses temporarily suspend the data processing to execute the calibration for regulating and optimizing the apparatus operation parameters. In cases where upon the data regeneration or recording there have occurred errors attributable to dusts or scratches on the medium or to defects upon the medium formation and servo abnormality or other errors due to external vibrations, normal ending is achieved by retry after the execution of the error recovery.

Recent application of the optical storage apparatuses to the multimedia adaptable data processing systems necessitates recording/regeneration of successive data streams such as acoustic data or animation data. In case of recording and regenerating acoustic data or animation data, those data are typically sequential data, so that sequential processing is performed for recording and regenerating them on the optical disk medium in a sequential manner. The sequential data such as the acoustic data or animation data need by nature sequential recording and regeneration. Hence, if a long wait occurs in the midcourse of recording and regeneration, then it becomes hard to process the subsequent data one after another, resulting in an error. In this manner, it would be preferred not to suspend the processing for the recording and regeneration of the acoustic data or the animation data. On the other hand, the current optical storage apparatuses execute the servo calibration for the purpose of adjusting various parameters which may vary with the temperature variances or with the elapsed time. Also in cases where the set count is exceeded from the seek error statistical information, the servo calibration is carried out for adjusting the apparatus variances or apparatus-medium eccentricity information. Such servo calibration processing takes a time of the order of three to four seconds. In the event of occurrence of an error upon the recording/regeneration, error recovery processing is instantly activated to bring a normal ending through the retry after the error recovery operations. Correspondingly to the degree of the errors, this recovery processing includes serious error recovery processing, intermediate error recovery processing and light error recovery processing, and if normally ended, the calibration processing is carried out. Thus, six to seven seconds are needed since the calibration processing is added to the error recovery processing of the error. For this reason, if the calibration is started during the recording or regeneration of the acoustic data or animation data, then the halt time in recording/regeneration may occur that could not be accommodated by the data transfer buffer, which may possibly results in deficiencies such as a screen data halt in regeneration.

SUMMARY OF THE INVENTION

According to the present invention there is provided a storage apparatus and a calibrating method therefor, ensuring appropriate execution of calibrations and error recoveries without suspending a the recording/regeneration of sequential data.

The storage apparatus of the present invention comprises a calibration processing unit for executing a calibration when predetermined operative conditions are satisfied; and a calibration invalidation unit for temporarily invalidating execution of the calibration if the calibration operative conditions are satisfied during processing of sequential data, the calibration invalidation unit permitting the execution of the calibration after termination of the sequential data processing. Thus, in case of recording or regenerating sequential data such as acoustic data or animation data having the highest priority on time-sequentially continuous actions, in spite of satisfaction of calibration operative conditions the execution of the calibration is temporarily suspended till the termination of the regeneration or recording of the sequential data, with the result that the sequential data recording or regeneration will be prevented from being suspended.

The calibration invalidation unit includes a sequential data judgment unit for judging whether sequential data are being processed, the sequential data judgment unit making a judgment that the sequential data are being processed if recording or regeneration continues for a predetermined period of time and if a regeneration or recording track on a medium is continued. The sequential data judgment unit makes a judgment that the sequential data are being processed if a sequential data processing mode is set. The calibration processing unit makes a judgment that the calibration operative conditions have been satisfied in cases where the apparatus temperature variance on a predetermined time basis exceeds a predetermined value, where the elapsed time after loading of a medium exceeds a predetermined time, or where the seek error count exceeds a predetermined value.

The storage apparatus of the present invention further comprises an error recovery processing unit which, upon the occurrence of an error, makes a recovery to cancel the error and thereafter makes a retry, the error recovery processing unit executing calibration processing when the error recovery is normally terminated. Upon the execution of calibration processing by the error recovery processing unit, the calibration invalidation unit temporarily invalidates the execution of the calibration if processing of sequential data is in process, and permits the execution of the calibration after the termination of the sequential data processing. The error recovery processing unit classifies errors which have occurred, into a serious error, an intermediate error and a light error. When a serious error occurs, the error recovery processing unit executes serious error recovery processing. When a light error occurs or when the serious error recovery processing is normally terminated, the error recovery processing unit executes light error recovery processing. When the light error recovery processing is normally terminated, the error recovery processing unit executes calibration processing if predetermined calibration operative conditions are satisfied. When the intermediate error recovery processing is normally terminated, the error recovery processing unit compulsorily executes the calibration processing without judging the calibration operative conditions. In this case, the calibration invalidation unit temporarily invalidates execution of the calibration if processing of sequential data is in process, and allows the execution of the calibration after termination of the sequential data processing. Thus, as to the recovery processing for the error which has occurred during the recording or regeneration, in case of the error which has occurred during the recording or regeneration of the sequential data, the execution of the calibration processing will temporarily be suspended till the termination of the sequential data recording or regeneration, thereby preventing the error recovery processing from taking too much time to consequently impede the recording or regeneration of the sequential data. The calibration invalidation unit creates and stores a status (temporary invalid flag) indicative of the temporary invalidation of the calibration, and, if the sequential data processing is terminated with the absence of the other processings, executes the calibration processing which has temporarily been invalidated.

The present invention provides a calibrating method for the storage apparatus, the method comprising the steps of a calibration processing step for executing a calibration when predetermined operative conditions are satisfied; and a calibration invalidation step for temporarily invalidating execution of the calibration if the calibration operative conditions are satisfied during processing of sequential data, the calibration invalidation step including permitting the execution of the calibration after termination of the sequential data processing. The details of this calibrating method are substantially the same as the case of the storage apparatus.

The above and other objects, aspects, features and advantages of the present invention will become more apparent from the following detailed description when read in conjunction with the accompanying drawings.

BRIEF DESCRIPTION OF THE DRAWINGS

FIG. 2 is an explanatory diagram of the apparatus internal structure with an MO cartridge loaded therein;

FIGS. 3A and 3B are function block diagrams of a TES detection circuit, a TZC circuit and a DSP of FIGS. A1 and 1B;

FIGS. 4A and 4B are function block diagrams of calibration processing and error recovery processing in accordance with the present invention;

DETAILED DESCRIPTION OF THE PREFERRED EMBODIMENTS

Figure 1A:
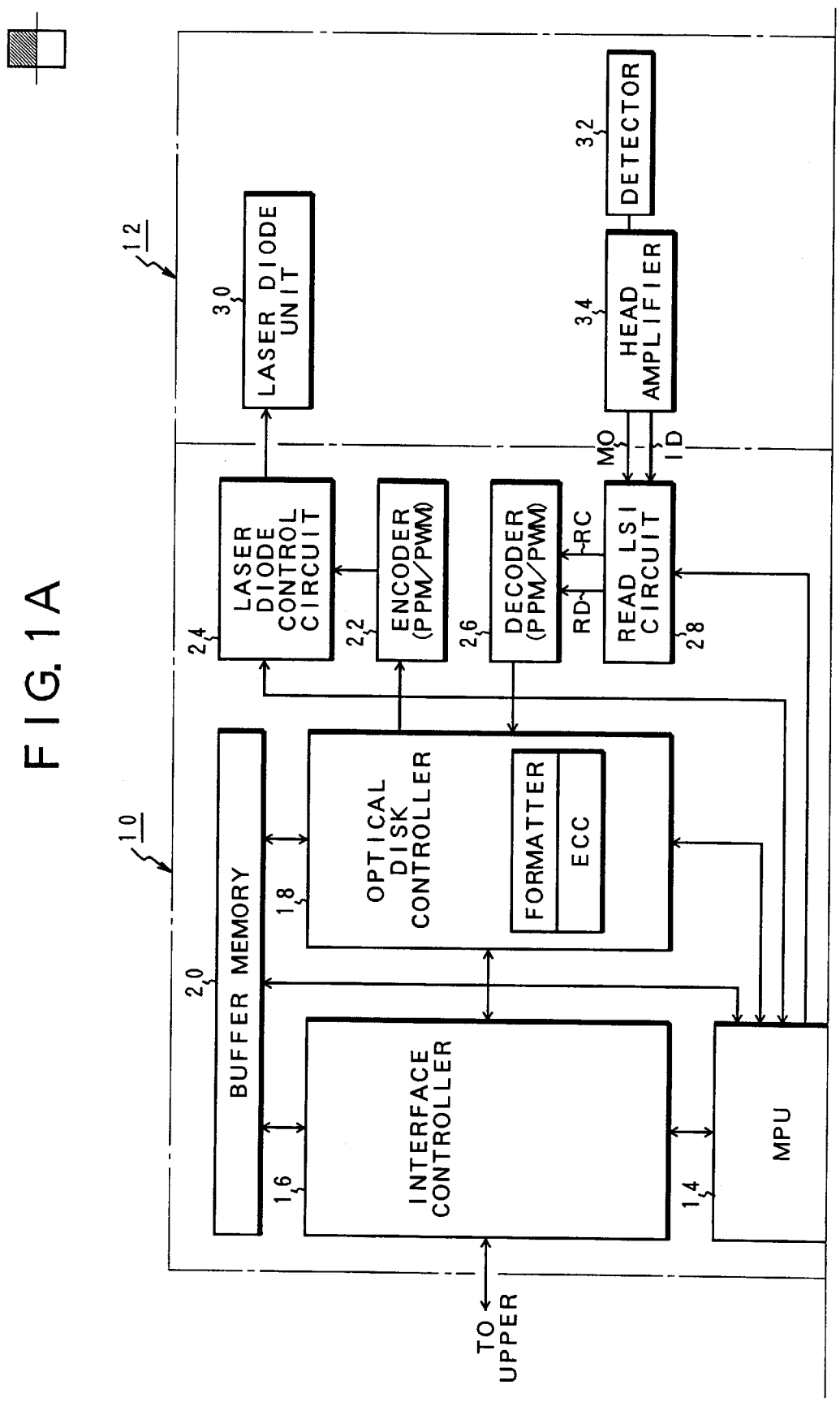
FIGS. 1A and 1B are block diagrams of an optical disk drive in accordance with the present invention.
Figure 1B:
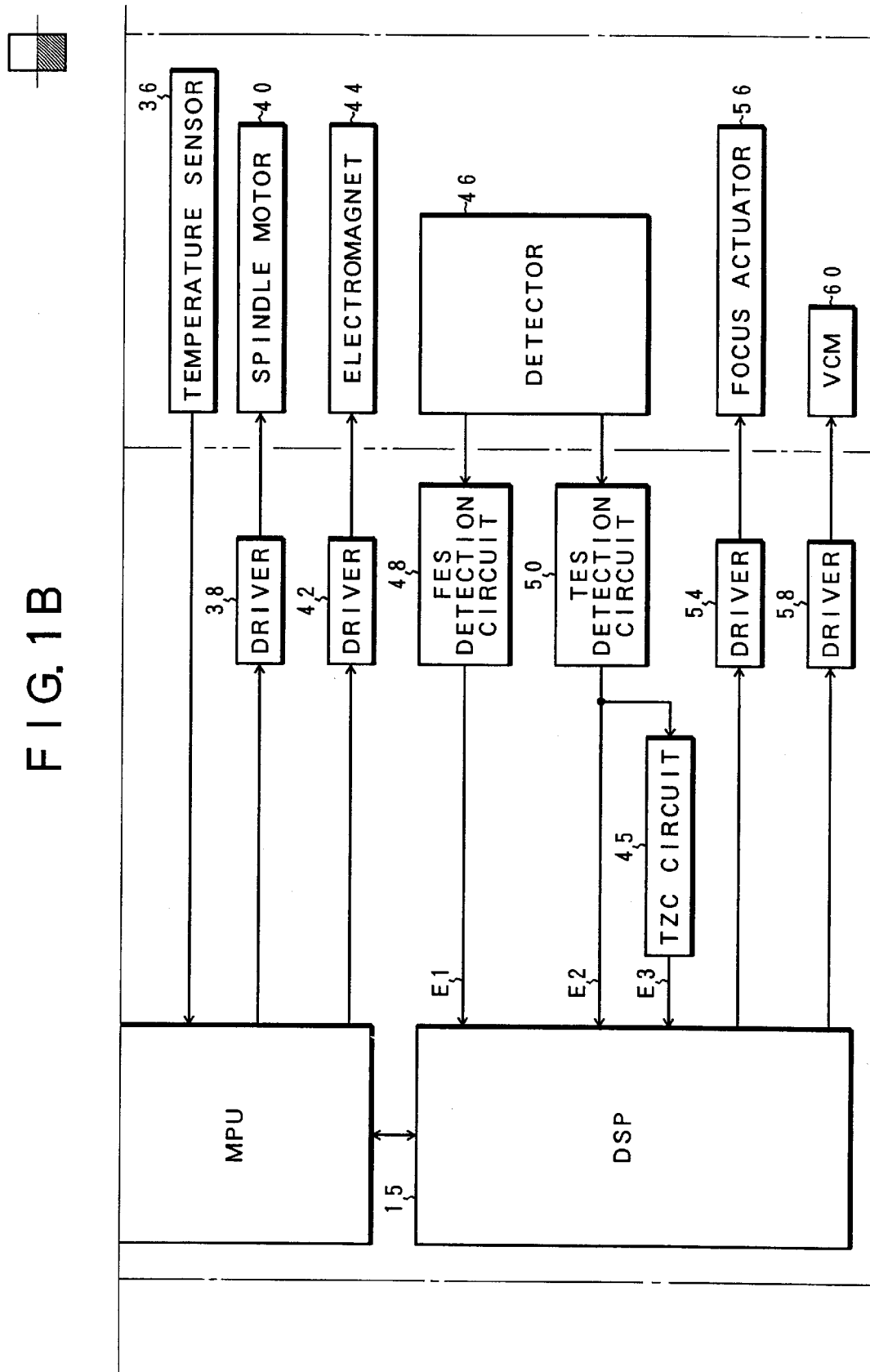

FIGS. 1A and 1B are circuit block diagrams of an optical disk drive which is an example of a storage apparatus in accordance with the present invention. The optical disk drive of the present invention is constructed of a control unit 10 and an enclosure 12. The control unit 10 comprises an MPU 14 for providing the entire control of the optical disk drive, an interface controller 16 which interchanges commands and data with upper apparatuses, an optical disk controller (ODC) 18 equipped with a formatter and an ECC function (error detection correction function) which are required for data read from and write to an optical disk medium; and a buffer memory 20. The optical disk controller 18 is associated with an encoder 22 and a laser diode control circuit 24 which serve as a write system, the control output of the laser diode control circuit 24 being provided to a laser diode unit 30 provided in the enclosure 12. The laser diode unit 30 includes laser diodes and a light reception element for monitoring which are integrally formed. In this embodiment, use of the laser diode unit 30 allows use of an optical disk for recording and regeneration, e.g., a removable MO cartridge medium such as an MO cartridge medium of 128 MB, 230 MB, 540 MB or 640 MB, a direct overwrite 230 MB, 540 MB or 640 MB medium, or an MSR (Magnetic Super Resolution) 1.3 GB medium. Among them, the 128-MB MO cartridge medium adopts pit position modulation recording (PPM recording) in which data is recorded in response to the presence or absence of a mark on the medium. The medium recording format is a ZCAV, with the 128-MB medium being of one zone. The MO cartridge media of 230 MB, 540 MB, 640 MB and 1.3 GB providing a high-density recording adopt a pulse width modulation recording (PWM recording) in which data is correlated with mark edges, i.e., leading edge and trailing edge of the mark. The PPM and PWM recording may be called "mark recording" and "edge recording", respectively. In this case, the difference of storage capacity between the 640-MB medium and 540-MB medium arises from the difference of the sector capacity. 2-KB sector capacity results in the 640-MB medium, and 512-B sector capacity results in the 540-MB medium. The medium format is the ZCAV, with the 130-MB medium being of 10 zones, 640-MB medium of 11 zones, and 540-MB and 1.3-GB media of 18 zones. In this manner, the optical disk drive of the present invention is operable for the MO cartridges of various storage capacities, i.e., 128 MB, 230 MB, 540 MB, 640 MB and 1.3 GB and the direct overwrite medium cartridge. Thus, when the MO cartridge is loaded into the optical disk drive, a medium ID unit is read so that the MPU 14 can recognize the medium type from its pit interval. The optical disk controller 18 is posted on the result of type recognition to effect the formatter processing corresponding to the PPM recording if it is the 128-MB medium and to effect the formatter processing in conformity with the PWM recording if it is the 230-MB, 540-MB, 640-MB or 1.3 GB media.

The optical disk controller 18 is associated with a decoder 26 and a read LSI circuit 28 which provide a read system. The read LSI circuit 28 receives a laser diode 30 beam return light reception signal in the form of an ID signal and an MO signal via a head amplifier 34 from a detector 32 provided in the enclosure 12. The read LSI circuit 28 is provided with circuit functions such as an AGC circuit, a filter, a sector mark detection circuit, a synthesizer and a PLL. The read LSI circuit 28 creates read-clocks and read data from an input ID signal and MO signal for the output to the decoder 26. Due to the adoption of the zone CAV as the medium recording system effected by a spindle motor 40, the MPU 14 issues a clock of a zone corresponding frequency in the form of a read clock to the built-in synthesizer of the read LSI circuit 28. In case of 128-MB medium, depending on the medium type by the optical disk controller 18, the modulation system of the encoder 22 and the demodulation system of the decoder 26 are switched to PPM recording modulation and demodulation systems, respectively. For the 230-MB medium, 540-MB medium, 640-MB medium and 1.3-GB medium, switching is made to the PWM recording modulation and demodulation systems.

The MPU 14 receives a detection signal from a temperature sensor 36 provided on the enclosure 12 side. On the basis of the intra-apparatus environment temperature detected by the temperature sensor 36, the MPU 14 performs recording processing (test write processing) for controlling read, write and erase emission powers in the laser diode control circuit 24 to their respective optimum values. By way of a driver 38, the MPU 14 provides a control of the spindle motor 40 provided on the enclosure 12 side. Since the MO cartridge recording format is the ZCAV, the spindle motor 40 is rotated at a constant velocity of 3600 rpm for example. The MPU 14 is further provided with a function for interpreting the command from the host to control the recording/regeneration. The MPU 14 provides the control of recording or regeneration through the laser beam positioning relative to the medium sector specified by the command, and through the laser power control. At the same time, the MPU 14 is provided with an error recovery function for normally terminating the command execution through retry after the execution of the error recovery for eliminating error factors in case of occurrence of an error in recording or regeneration based on the command from the host. This error recovery includes execution of calibration upon the normal termination. The MPU 14 further executes calibration for judging whether the calibration operative conditions have been satisfied from the statistical information on the elapsed time from the medium loading, on temperature variances or on seek errors to adjust and optimize the variation factors of the servo system. In the present invention, when sequential data are being recorded or regenerated, the calibration is temporarily invalidated and interrupted so that the calibration is executed at the access halt timing after the termination of the sequential data recording or regeneration. By way of a driver 42, the MPU 14 further provides a control of an electro-magnet 44 disposed on the enclosure 12 side. The electro-magnet 44 is arranged opposite to the beam irradiation side of the MO cartridge loaded within the apparatus and serves to feed an external magnetic field to the medium upon recording and erasing.

A DSP 15 implements a servo function for positioning the beam from the laser diode unit 30 on the medium. To this end, the optical unit on the enclosure 12 side is provided with a four-split detector 46 for receiving a beam return light from the medium so that an FES detection circuit (focus error signal detecting circuit) 48 can generate a focus error signal E1 from a light-reception output of the four-split detector 46, for the input to the DSP 15.

A TES detection circuit (tracking error signal detection circuit) 50 generates a tracking error signal E2 from a light-reception output of the four-split detector 46, for the input to the DSP 15. The tracking error signal E2 is fed to a TZC circuit (track zero-cross detection circuit) which generates a track zero-cross pulse E3 for the input to the DSP 15. For the purpose of beam positioning, the DSP 15 controllably drives a focus actuator 56 and a VCM 64 by way of drivers 54 and 58.

FIG. 2 is a schematic view of the enclosure of the optical disk drive. In FIG. 2, a housing 66 houses a spindle motor 40 having a rotational axis hub into which an MO cartridge 70 is inserted from the inlet door 68 side so that an internal MO medium 72 can be loaded into the spindle motor 40 rotational axis hub of the spindle motor 40. Below the thus loaded MO medium 72 in the MO cartridge 70 there is disposed a carriage 76 that is displaceable across the medium track by way of the VCM 64. An objective lens 80 is mounted on the carriage 76 and receives a beam from the semiconductor laser provided in a fixed optical system 78 through a prism 82, to form a beam spot on the medium face of the MO medium 72. The objective lens 80 is controllably displaced in the optical axis direction by the focus actuator 56 included in the enclosure 12 of FIG. 1.

Figure 3B:
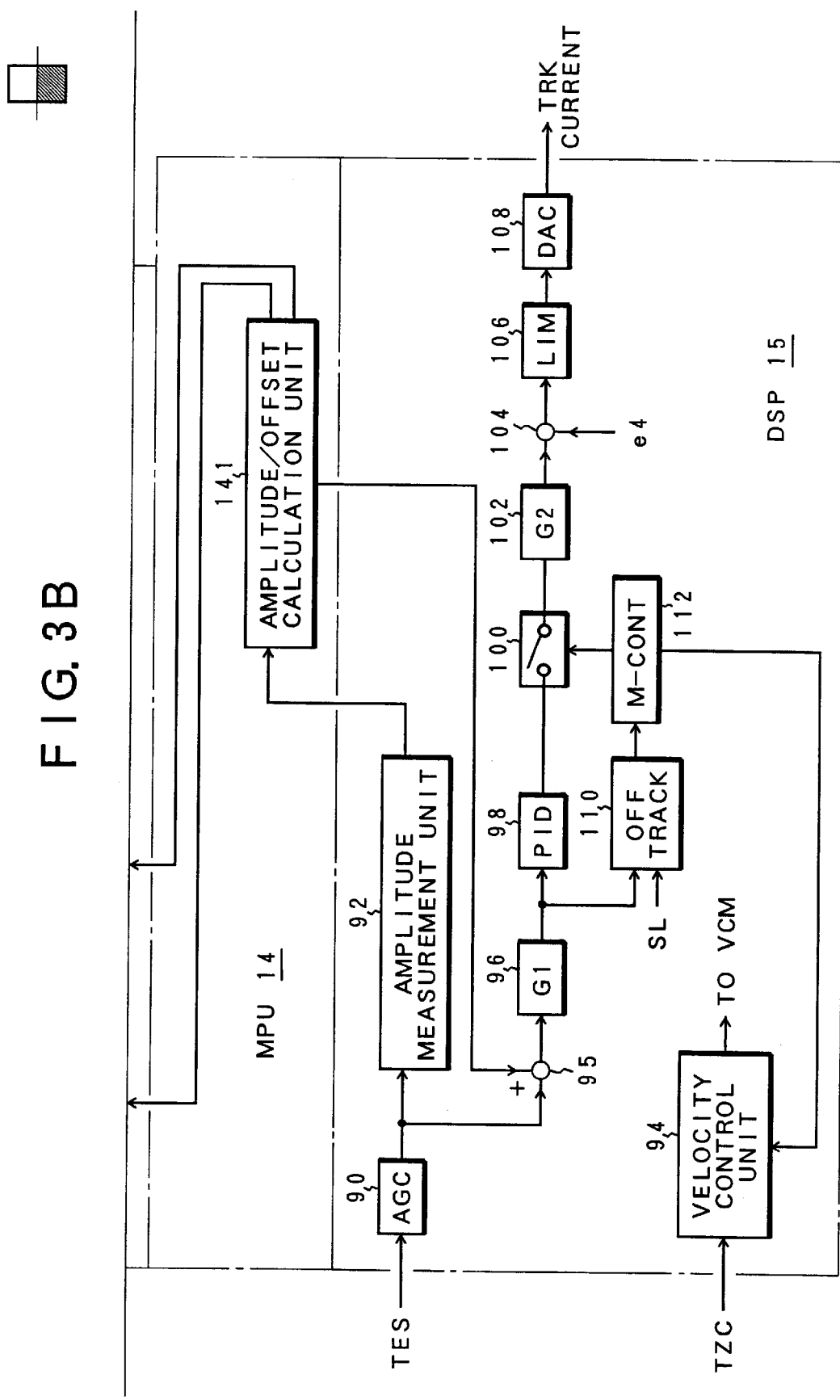

FIGS. 3A and 3B are function block diagrams of the TES detection circuit 50, the TZC circuit 45 and the DSP 15 of FIG. 1. From the output of the four-split detector 46, the TES detection circuit 50 generates a tracking error signal TESi in its former circuit not shown. The tracking error signal TESi is fed to an AGC circuit (automatic gain control circuit) 501 for regulating the gain of the tracking error signal TESi. A node 502 then adds an AGC output signal and a TES offset correction signal E2 together. The TES offset correction signal E2 serves to regulate the offset of the tracking error signal TESi and is fed from an amplitude/offset calculation unit 141 of the MPU 14. A gain regulation circuit 503 regulates the signal sensitivity of the tracking error signal. The gain regulation circuit 503 includes four amplifier circuits AMP that are connected in parallel and four switches SW associated respectively therewith for selective signal input. One is selected from the four amplifier circuits AMP so as not to exceed the AD converter range of the DSP 15. The amplitude/offset calculation unit 142 issuing the TES offset correction signal E2 provides as its output a gain selection signal el for selecting one of the switches SW of the gain regulation circuit 503. The tracking error signal output from the gain regulation circuit 503 passes through a notch circuit 504 and a low-pass filter (LPF) 506 to issue a noise-eliminated and waveform-shaped tracking error signal E3. The output of the gain regulation circuit 503 is fed to the TZC circuit 45. In the TZC circuit 45, a comparator 542 compares the tracking error signal TESi that has passed through the low-pass filter (LPF) 451 with a predetermined slice level and provides a track zero-cross pulse signal (TZC pulse signal) E2 as its output. An AD converter (ADC) 90 provided in the DSP 15 converts a TES signal E3 of the TES detection circuit 50 into digital data. The output of the AD converter 90 is read into the DSP 15 for each sampling frequency. In a track servo loop of the DSP 15, a node 95 receives a tracking error signal read by the AD converter 90, to add up the TES input stage d offset signal e3. A gain control unit 96 multiplies the tracking error signal from the node 95 with a gain 11 to accommodate the variances in the circuit constants and in the input sensitivity such as signal sensitivity. The output of the gain control unit 96 is fed to an off-track judgment unit 110 in which comparison is made between the input tracking error signal absolute value and the off-track slice level SL, for judgment of the off-track. If the tracking error signal absolute value is larger than the off-track slice level SL, then the off-track is judged. When the off-track is judged, an off-track flag is set. The off-track slice level SL is switched between the read processing and the write/erase processing. It is common to set the off-track slice level upon the write/erase processing to a level smaller than that upon the read processing. When the off-track judgment unit 110 sets the off-track flag, a main control unit 172 of the DSP turns off the switch 100 to shut off the track servo. The MPU 14 is posted on the servo error interruption. The output of the gain control unit 96 is fed to a PID arithmetic unit 98. The PID arithmetic unit 98 performs phase compensation processing. When the switch 100 is turned on, the output of the PID calculation unit 98 is fed to the gain control unit 102 during on-state of the track servo. The gain control unit 102 multiplies the output of the PID arithmetic unit 100 with a gain G2, to accommodate variances in the output sensitivities such as the driver drive sensitivity and actuator acceleration. A node 104 then adds an output stage offset signal e4 to the output of the gain control unit 102. The output of the node 104 is fed to a DA converter 108 by way of a limiter 106. The DA converter 108 converts digital data of a limiter 106 into an analog track current and provides as its output to the driver 58 of FIG. 1B to drive the VCM 60. Upon the seek processing, the difference between a target position and a current position is set into a velocity control unit 94 of the DSP 15. The velocity control unit 94 provides a velocity signal depending on the difference as its output to the driver 58 of FIG. 1 to thereby drive the VCM 60. An amplitude measurement unit 92 of the DSP 15 measures the amplitude value of the tracking error signal output from the AD converter 90. The amplitude/offset calculation unit 141 provided in the MPU 14 figures out the gain and offset of the tracking error signal from the amplitude value obtained by the amplitude measurement unit 92. The memory of the MPU 14 stores therein a gain e1 and offsets e2 and e3 calculated by the amplitude/offset calculation unit 141, for use as the control parameters.

FIGS. 4A and 4B are function block diagrams of the calibration processing and the recovery processing in accordance with the present invention, implemented by the firmware provided in the MPU 14 of FIGS. 1A and 1B. The firmware of the MPU 14 includes a control register 114, a command processing unit 116, an access execution unit 118, a recovery processing unit 120, a calibration processing unit 122 and a calibration invalidation unit 124. The control register 114 stores therein the apparatus temperature, the medium type of the loaded magneto-optical disk medium, a reception command for the recording and regeneration from the host, and a set mode of the mode indicative of processing of the sequential data. The command processing unit 116 includes a record processing unit 126 and a regeneration processing unit 128. If the command from the host stored in the control register 114 is a write command, then the record processing unit 126 operates such that the access execution unit 118 allows a laser beam to seek a target sector of the target track specified by the command for on-track. In this state, the laser diode is controlled to the erase power to erase the target sector, after which the laser power is controlled to the recording power, for the target sector data writing. If the input command from the host stored in the control register 114 is a read command, then the regeneration processing unit 128 operates such that the access execution unit 118 allows a laser beam to controllably seek a target sector of the target track for on track. In this state, the laser diode is controlled to the read power for data read. When an error occurs upon the recording or regeneration by the command processing unit 116, the error recovery processing unit 120 carries out the error recovery operation to cancel the error factors, and thereafter performs retry to normally terminate the recording or regeneration. In this embodiment, for the execution of recovery processing depending on the degree of the error, the error recovery processing unit 120 comprises a serious error recovery unit 130, an intermediate error recovery unit 132 and a light error recovery unit 134. In case of the error recovery of the present invention, the light error and the intermediate error are subjected to separate recovery processing by an intermediate error recovery unit 132 and a light error recovery unit 134, respectively, although the serious error recovery is first subjected to the recovery processing by a serious error recovery unit 130 and then subjected to the recovery processing by the light error recovery unit 134. In the event of normal termination of the light error recovery after the normal termination of the serious error recovery, or in the event of normal termination of only the light error recovery, calibration is carried out by the calibration processing unit 122. The calibration is carried out in the case of normal termination of the intermediate error recovery as well. The details of this recovery processing will be described later. The calibration processing unit 122 comprises an operational condition judgment unit 136 for judging the operative condition of the calibration, and a calibration execution unit 138 for actually carrying out the calibration when it is judged that the calibration operative conditions have been satisfied.

The calibration operative conditions judged by the operational condition judgment unit 136 includes judgment of three items which follow.

(I) The temperature variation every lapse of a constant period of time after the medium loading is not less than a set value;

(II) The elapsed time after the medium loading is not less than a set value; and (III) The seek error count after the medium loading is not less than a set value.

Naturally, when the calibration is executed as a result of satisfaction of the three calibration operative conditions and terminated, the calibration termination point may be regarded as the medium loading point so that judgment is made of the calibration operative conditions based on the temperature variations, elapsed time and seek error count. The calibration execution unit 138 regulates the variance factors such as the apparatus temperature variations and elapsed time judged as the calibration operative conditions and executes mainly the servo system regulation processing required for the optimum operative conditions. The calibration invalidation unit 124 comprises a sequential data judgment unit 140 and a temporary invalid flag 142. The calibration invalidation unit 124 makes a check of the presence or absence of satisfaction of the calibration operative conditions by the operational condition judgment unit 136 provided in the calibration processing unit 122, and if affirmative, it operates a sequential data judgment unit 140 to judge whether data based on the command from the host being currently recorded or regenerated in the command processing unit 116 are sequential data or not. If it is judged by the sequential data judgment unit 140 that the currently processed data are sequential data, then the temporary invalidation flag 142 is set to invalidate and suspend the execution of the calibration by the calibration execution unit 138. During the suspension of execution of the calibration by setting the temporary invalid flag 142, the sequential data judgment unit 140 monitors the recording or regeneration of the sequential data by the command processing unit 116. After the termination of the recording or regeneration of the sequential data, verification is made of the halt state where no other recording or regeneration is performed by the command from the host, allowing the calibration execution unit 138 to execute the calibration which has been suspended by the setting of the temporary invalid flag 142. This temporary invalidation of the calibration upon the judgment of the sequential data by the calibration invalidation unit 124 will apply equally to the calibration performed after the termination of the error recovery in the error recovery processing unit 120. If it is judged that the sequential data are being processed, then the temporary invalid flag 12 is set to suspend the calibration, allowing the calibration execution unit 138 to execute the calibration which has been suspended in the halt state where no other recording or regeneration is performed during or after the regeneration of the sequential data.

Figure 5:
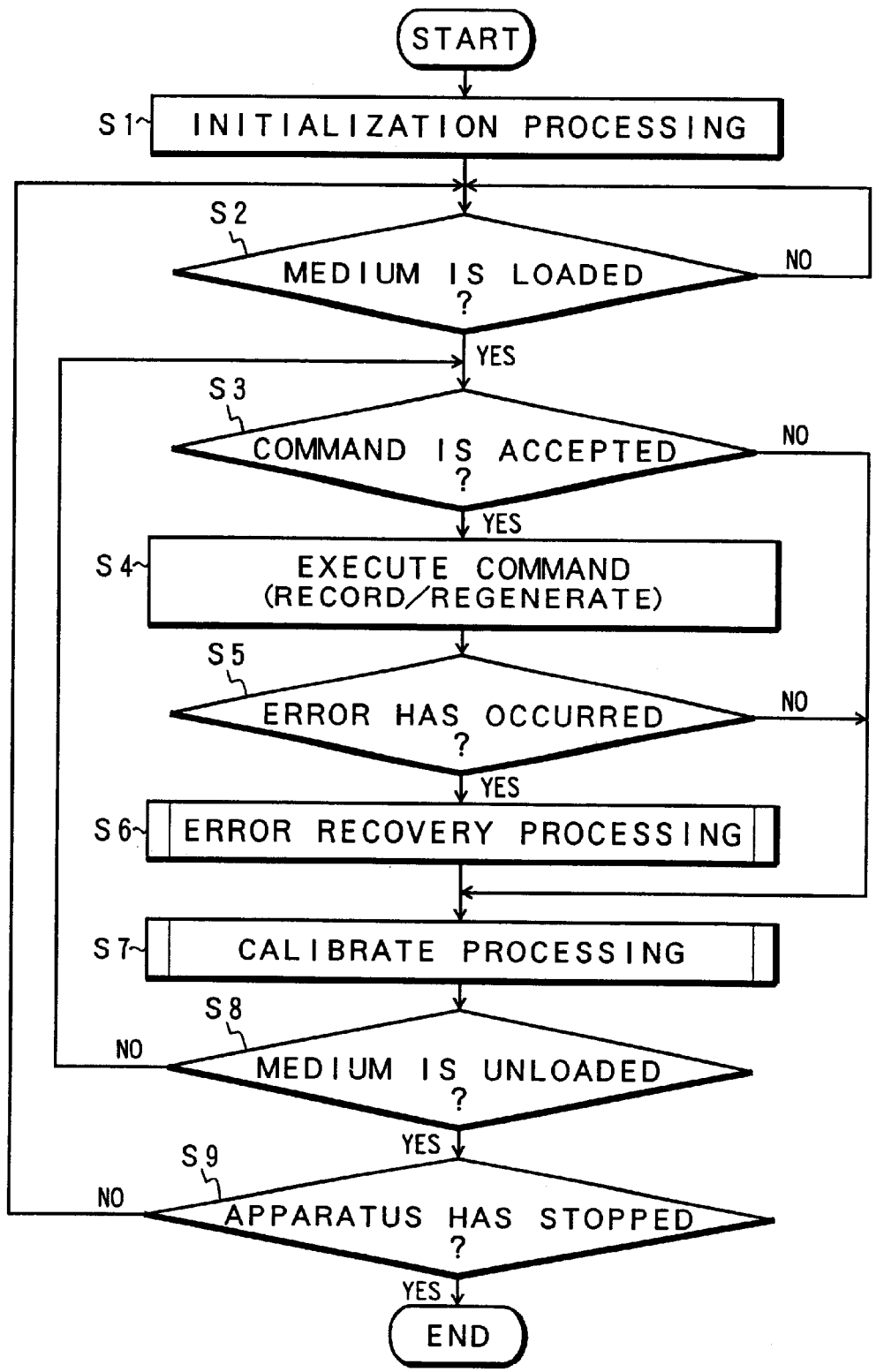
FIG. 5 is a flowchart of processing operations of the optical disk drive of FIGS. 1A and 1B.

FIG. 5 is a flowchart showing the processing operations effected by the optical disk drive of FIG. 1. When the optical disk drive is activated, initialization processing is carried out in step S1. This initialization processing includes setting and adjustment of the default values of erase power, write power and read power, and of the temperature correction coefficients, and a series of regulating processes of the servo system corresponding to the calibration. If the medium loading is judged in step S2, then the procedure goes to step S3 to make a check of the receipt of a command from the host. In the absence of the receipt of the command from the host, procedure goes to the calibration processing of step S7 in which it is judged whether preset calibration operative conditions have been satisfied or not, and if affirmative, then the calibration is carried out. In the presence of the receipt of the command from the host in step S3, then the procedure goes to step S4 where data recording or regeneration is carried out by the execution of the command. Herein, the write command upon the recording of the sequential data from the host contains plural pieces of transferred block data which have been previously defined by one write command, so that the writing is iterated as a result of receipt of the command data on a plural-block basis. Thus, the target track is judged from the target sector into which block data received by one write command are written, and the sequential data writing can be judged from the continuity between the trailing track No. of the most recent write command and the leading track No. of the current write command. In the case of the read command from the host for regenerating the sequential data, designation is made of the leading target sector and of the number of subsequent blocks to successively be regenerated, so that it is possible to judge the regeneration of the sequential data by recognizing the continuity of the track Nos. through the track conversion of the number of blocks of the regenerative sector. Herein, the judgment of the regenerative data as the sequential data can be made e.g., in case of continuous regenerative tracks and continuous regenerative operations for a predetermined period of time. Naturally, since the number of tracks to be regenerated is determined depending on the number of blocks of the read command, the regeneration of the sequential data may be judged in the event of regeneration of five or more consecutive tracks in regeneration of the predetermined number of tracks. If the occurrence of a servo system error is judged in step S5 during the recording or regeneration by the execution of the command from the host, then the recording or the regeneration is suspended to carry out the error recovery of step S6. In this error recovery, different recovery processing can be carried out that depends on the degree of the error, i.e., the serious error, intermediate error and the light error. In case of the normal termination in the error recovery rocessing as well, the calibration processing of step S7 is carried out. The processings of steps S3 to S7 are iterated till the judgment of the unloading of the medium in step S8. If the medium unloading is judged in step S8, the procedure goes to step S9. If the apparatus is not halted, then the procedure goes to step S2 to wait for the next medium loading.

Figure 6:
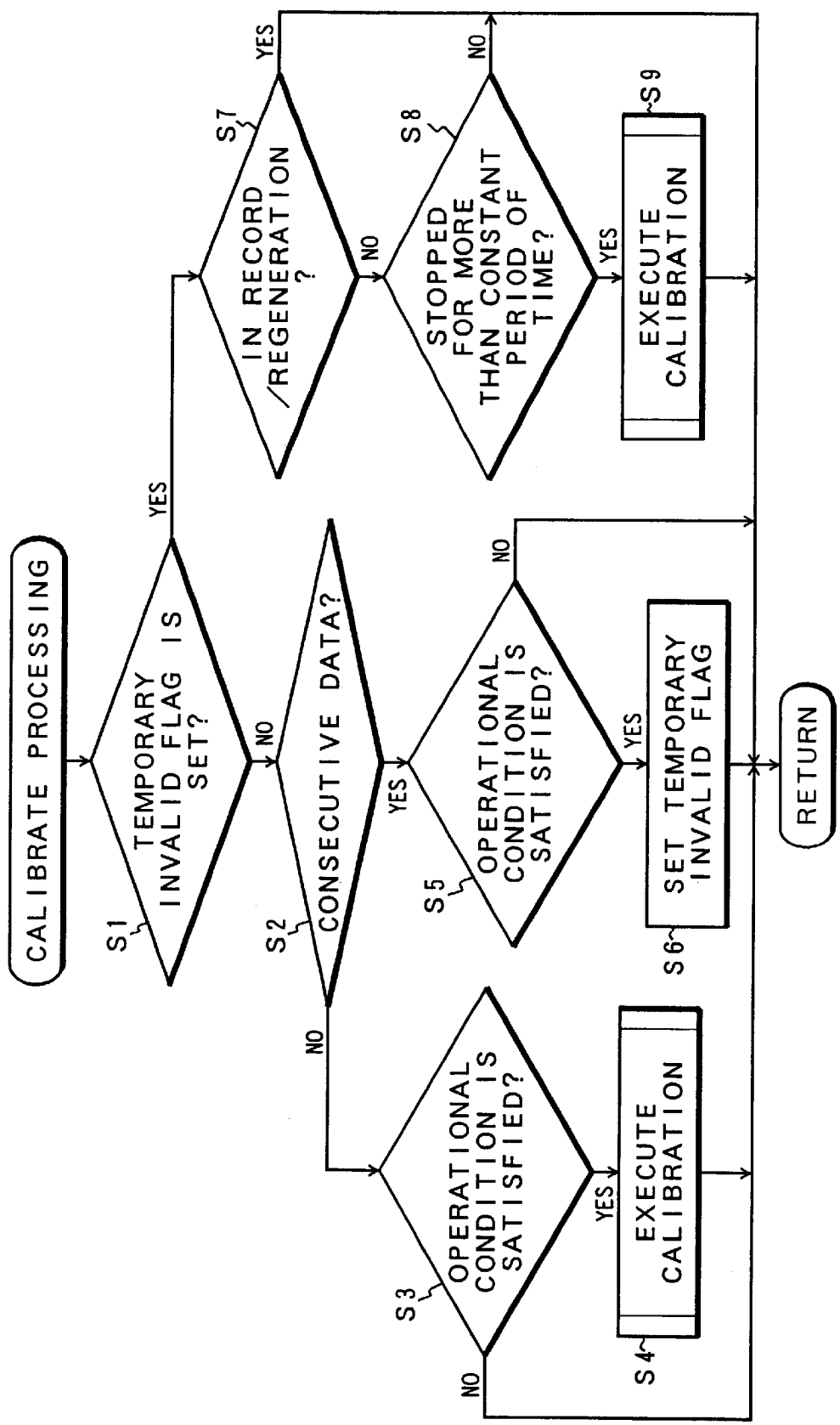
FIG. 6 is a flowchart of the calibration processing of FIG. 5.

FIG. 6 is a flowchart showing the details of the calibration processing effected in step S7 of FIG. 5. This processing is effected by the calibration processing unit 122 and the calibration invalidation unit 124 of FIG. 4. For the calibration processing, a check is first made in step S1 to see if the temporary invalid flag is set or not. Since no temporary invalid flag is set in the ordinary recording/regeneration, the procedure goes to step S2 to check whether it is the recording or regeneration of the sequential data. In cases where the recorded or regenerated data are random accessed as in the ordinary computer data or programs, no sequential data are judged allowing the procedure to advance to step S3 to judge whether the calibration operative conditions have been satisfied. If affirmative, then the procedure goes to step S4 to execute the calibration. On the other hand, if it is judged in step S2 that the data being in recording or regeneration are sequential data, then the procedure goes to step S5 to check whether the calibration operative conditions have been satisfied. In case of satisfaction of the calibration operative conditions, the temporary invalid flag is set in step S6 where no calibration is carried out. When the temporary invalid flag is set in step S6, setting of the temporary invalid flag is judged in step Si of the next calibration processing, allowing the procedure to go to step S7. In step S7, a check is made to see if it is in recording or regeneration, and if affirmative, then a return is made directly to the main routine of FIG. 5. If negative in step S7, then the procedure goes to step S8 to check whether it is a halt in which no other recording or regeneration is carried out during a constant period of time or over after the termination of the recording or regeneration. If the halt during the constant period of time or more is judged in step S8, then the procedure goes to step S9 to execute the calibration which has been suspended for the calibration operative conditions that have occurred upon the recording or regeneration of the sequential data.

Figure 7:
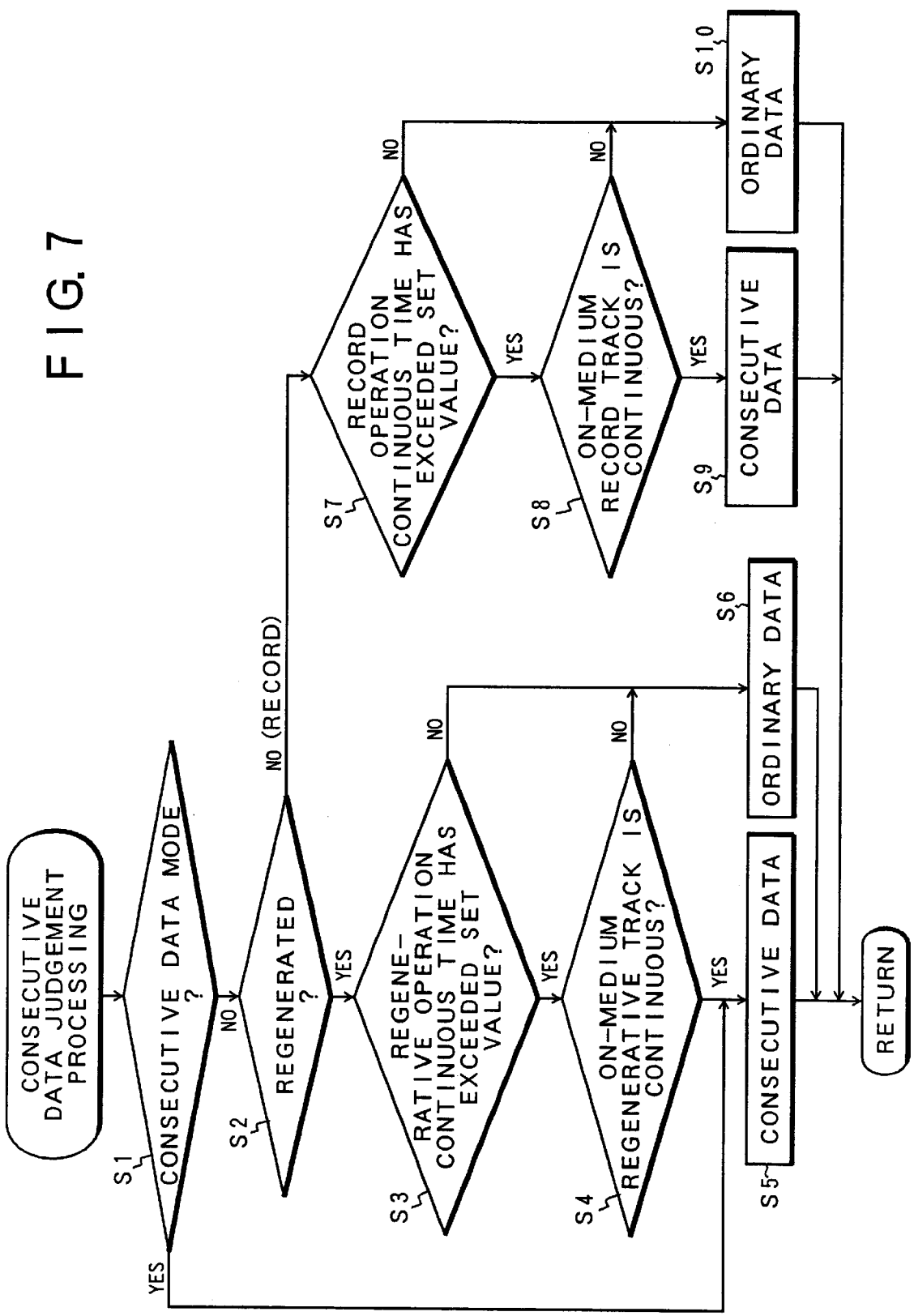
FIG. 7 is a flowchart of sequential data judgment processing in FIG. 6.

FIG. 7 shows the details of the sequential data judgment processing effected in step S2 of FIG. 6. This sequential data judgment processing includes first checking whether it is in sequential data mode or not in step S1. A setting mode indicative of the presence or absence of a sequential data processing mode is entered into the register 114 provided in the firmware the MPU 5 of FIG. 4. If the sequential data mode is set as a result of read of this setting mode, then the procedure goes to step S5 in which the sequential data are judged. If no sequential data mode is set in step S1, then the procedure goes to step S2 to check whether it is regeneration or not. If affirmative, then the procedure goes to step S2 to check whether the continuous time of the regenerative operation exceeds a set value. If affirmative, then the procedure goes to step S4 to check whether on-medium regeneration track is continuous or not. If affirmative, then they are the sequential data in step S5. If in-recording is judged in step S2, then the procedure goes to step S7 to judge whether the recording operation continuous time exceeds a set value. If affirmative, then it is judged in step S8 whether the on-medium recording tracks are continuous or not. If affirmative, then the sequential data are judged in step S9. Otherwise, the normal data are judged as in steps S6 and S10. Utilization of this mode setting eliminates the need to distinguish whether it is the random access or sequential access in case of driving as the sequential data processing dedicated drive. The mode setting may be variable by means of a set switch.

Figure 8:
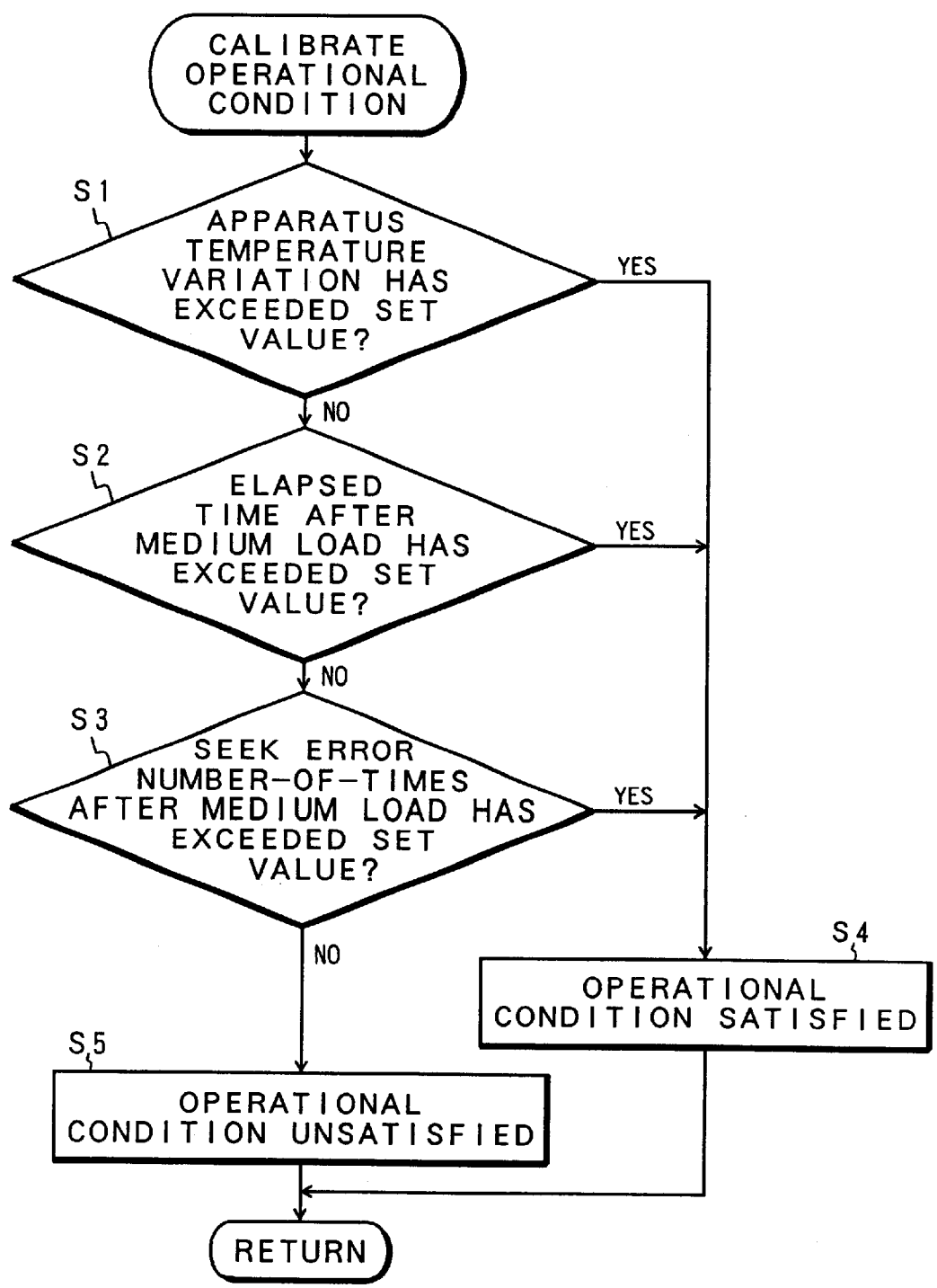
FIG. 8 is a flowchart of judgment processing of calibration operation conditions in FIG. 6.

FIG. 8 shows the judgment processing of the calibration operative conditions effected in steps S3 and S5 of FIG. 6. In this judgment processing of the calibration operative conditions, a check is first made in step S1 to see if the temperature variation exceeds a set value, e.g., 5° C. at the elapse of a constant period of time, e.g., one minute after medium loading. If 5° C. is exceeded, then it is judged in step S4 that the calibration operative conditions have been satisfied. A check is made in step S2 to see if the elapsed time after the medium loading exceeds a set value or not. If the elapsed time exceeds e.g., five minutes, then the satisfaction of the calibration operative conditions is judged in step S4. A check is further made in step S3 to see if the seek error count after medium loading exceeds a set value, e.g., 16. If the seek error count exceeds 16, then the-procedure goes to step S4 to judge that the calibration operative conditions have been satisfied. Naturally, in case none of the operative conditions of the steps S1, S2 and S3 have been satisfied, then it is judged in step S5 that the operative conditions have been unsatisfied. If satisfaction of the calibration operative conditions is judged in step S4, then the procedure advances from step S3 to step S4 of FIG. 6 to immediately execute the calibration processing. During the processing of the sequential data of step S5 of FIG. 6, the temporary invalid flag is set in step S6, after which when the sequential data recording or regeneration is terminated and a constant halt time elapses in steps S7 and S8, the suspended calibration is resumed in step S9. If the calibration is carried out after the satisfaction of the calibration operative conditions in this manner, then steps S1, S2 and 53 of FIG. 8 regard the calibration ending point as the medium loading point, allowing the judgment of satisfaction of the operation conditions to again be iterated.

Figure 9:
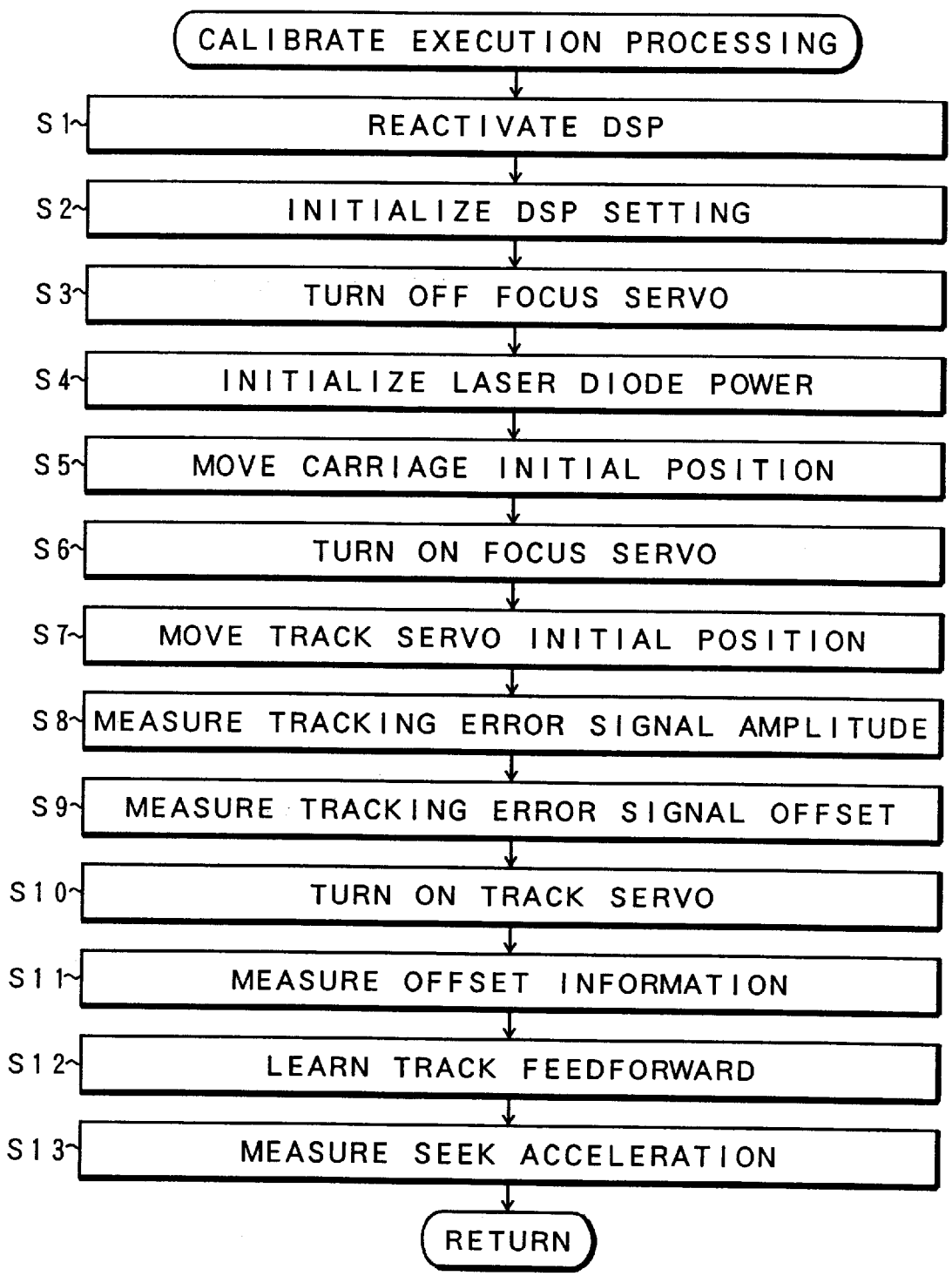
FIG. 9 is a flowchart of calibration execution processing in FIG. 6.

FIG. 9 shows the details of the calibration execution processing effected in steps S4 and S9 of FIG. 6. This calibration execution processing includes reactivating the DSP in step S1. The DSP reactivation maximizes LS1 clocks so that the reactivation is carried out when the DSP hangs into slipped state. The DSP setting initialization of step S2 includes setting of various parameters for use in the DSP servo control into their initial states. Then in step S3 the focus servo is shut off. With the focus servo shut off, the laser diode power initialization is carried out in step S4. Then in step S5 the carriage is displaced to its initial position, after which the focus servo is turned on for activation in step S6. Then in step S7 the carriage is displaced to the track servo initial position and in step S8 amplitude measurement is made of the tracking error signal. Then in step S9 offset measurement is made of the tracking error signal, and thereafter track servo is turned on in step S1O. Then in step S11, the medium eccentricity is measured to perform the eccentricity information measurement processing for determining the amount of correction. Then in step S12, the carriage shaft friction state is learned to perform the track feedforward learning for carriage operative configuration. Finally in step S14 the seek acceleration measurement is carried out. Such calibration execution processing ordinarily needs a time of the order of 3 to 4 seconds. It is to be noted that the calibration processing of FIG. 9 is presented by way of example. It is natural that the other adjustment processings may be included and that any specific adjustment processings may be excluded from FIG. 9.

Figure 10:
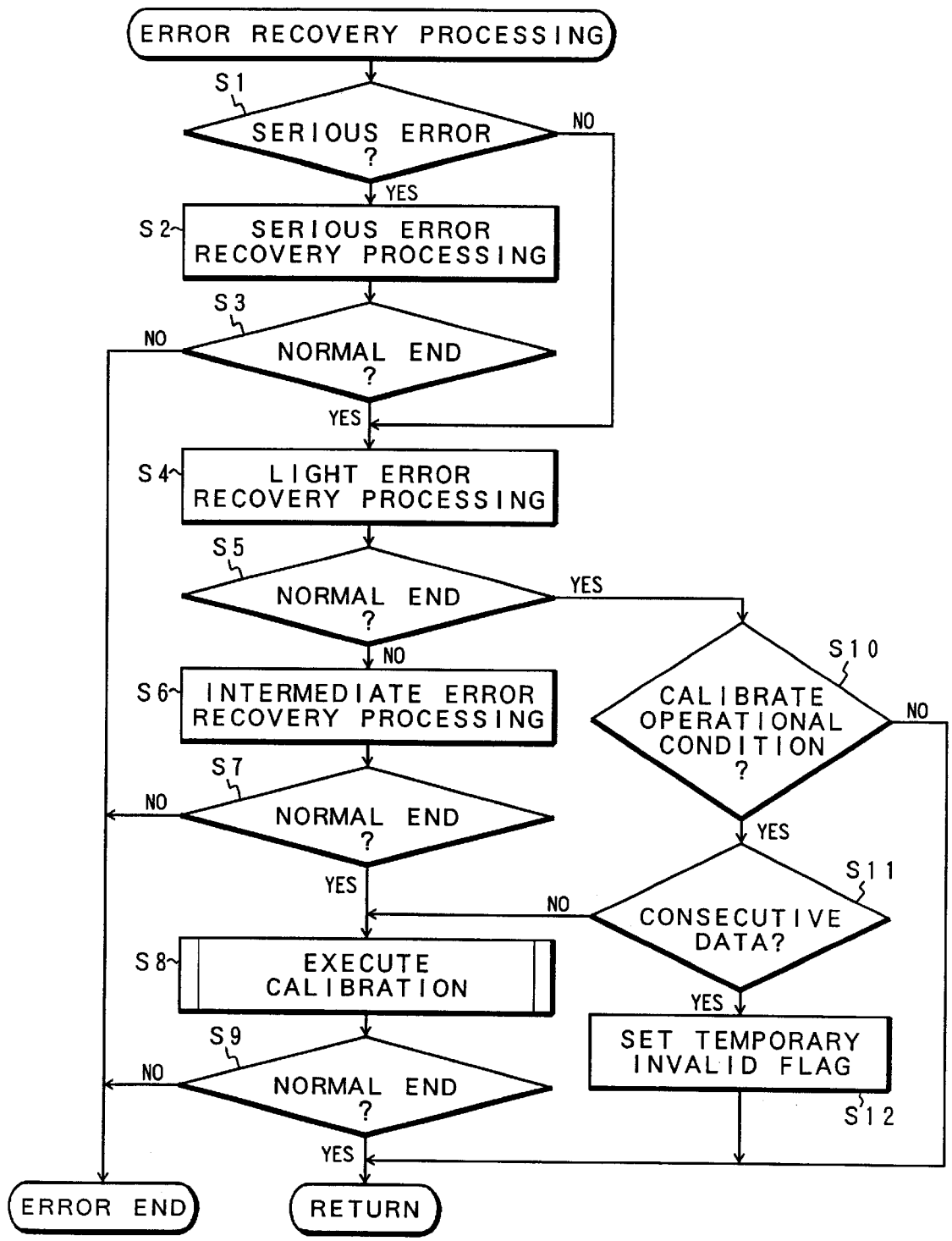
FIG. 10 is a flowchart of error recovery processing of FIG. 5.

FIG. 10 shows the details of the error recovery effected in step S6 of FIG. 5 by the error recovery A processing unit 120 of FIG. 4. In this error recovery processing, a check is made to see if the error is a serious error that has occurred upon the data recording or regeneration based on a command received from the host. If it is the serious error, then the procedure goes to step S2 to execute the serious error recovery processing. If this serious error recovery processing is normally terminated in step S3, then the light error recovery processing is carried out in step S4. If the light error recovery processing is normally terminated in,step S5, then the procedure goes to step S1O to check the calibration operative conditions. If the operative conditions are satisfied, then a check is made to see if they are the sequential data or not in step S11. If negative, then the calibration is carried out in step S8 and it is judged in step S9 whether it has normally been terminated. The error recovery processing is thus terminated. If the sequential data are judged in step S11, then the temporary invalid flag is set in step S12. In this event, the calibration is carried out in the state of halt for a constant period of time after the termination of the sequential data recording or regeneration in the steps S1, S7, S8 and S9 of FIG. 6. Then in case of occurrence of the intermediate error during the recording or regeneration, the procedure advances from the step S1 to step S4 to first perform the light error recovery processing. If the light error recovery processing is abnormally terminated, then the procedure advances from step S5 to step S6 to perform the intermediate error recovery processing. If the normal termination of the intermediate error recovery processing is judged in step S7, then the procedure advances to step S8 to compulsorily execute the calibration processing without judging the calibration operative conditions. In the event of occurrence of the light error during the recording or regeneration, the procedure advances from step S1 to step S4 to perform the light error recovery processing. If the light error recovery processing is normally terminated, then the procedure advances from step S5 to step S10 to judge the calibration operative conditions. If satisfaction of the calibration operative conditions is judged by the judgment processing of FIG. 8, then the calibration is carried out in step S8 as long as they are not the sequential data. Alternatively, if they are the sequential data, then the invalid flag is once set in step S12 to resume the calibration which has been suspended at the point when a constant halt time has elapsed after the sequential data recording or regeneration.

Description will then be made of the light error recovery processing, the intermediate error recovery processing and the serious error recovery processing in the recovery processings of FIG. 10. First, the light error recovery processing is a simple recovery process allowing a rapid recovery to the on-track state and includes the procedure which follows.

(1) The MPU 14 is posted on the error interruption when off-track has consecutively occurred by the predetermined number of times on the DSP 15 side;

(2) The MPU 14 judges whether the tracking error signal has an amplitude exceeding the specified value; and (3) If the tracking error signal has the amplitude exceeding the specified value, then the MPU issues a track servo on command to the DSP 15 to turn on the switch 100 of FIG. 3.

In this manner, the light recovery processing allows a rapid recovery to the on-track state by turning on the track servo and is a process in which a track servo on command is issued from the MPU 14 to the DSP 15.

Then the intermediate error recovery processing includes the following procedure.

(1) The MPU 14 issues a focus servo off command to the DSP 15;

(2) With the focus servo off normally terminated, the MPU 14 performs a push-in processing for positioning the carriage at a location where the home position sensor is turned on; and (3) When the push-in processing is normally ended, the MPU 14 performs a step-out processing for canceling the push-in state to position the carriage at a grooved location; i.e., the carriage is displaced to a position where the home position sensor is turned off;

(4) When the step-out processing is normally ended, the MPU 14 issues a focus servo on command to the DSP 15 to turn on the focus servo loop;

(5) When the focus servo on is normally ended, the MPU 14 issues a track servo on command to the DSP 15 to turn on the switch 100 in the DSP 15 of FIG. 3. If the track servo on results in on track, it is regarded as a normal termination.

In this manner, the intermediate error recovery processing is a process in which, with the assumption that a light beam strikes on a on-track impossible position, e.g., on a mirror face on the track, the carriage is positioned at a location where the track is present after the positioning at the inner reference location so that the recovery to the on-track state is made by the servo on command.

Then the serious error recovery processing includes the procedure which follows.

(1) The MPU 14 issues a focus servo off command to the DSP 15 to turn off the focus servo;

(2) With the focus servo off normally terminated, the MPU 14 performs a push-in processing for positioning the carriage at a location where the home position sensor is turned on;

(3) With the push-in processing normally terminated, the MPU 14 performs a step-out processing for displacing the carriage to a grooved location, i.e., a location where the home position sensor is turned off;

(4) When the step-out processing normally ends, the MPU 14 issues a focus servo on command to the DSP 15 to turn on the focus servo loop;

(5) In response to the normal ending of the focus servo on, the MPU 14 performs a calibration processing of the tracking error signal. This tracking error signal calibration processing includes adjusting the tracking error signal amplitude and offset by the amplitude/offset calculation unit 141 on the basis of the measurement results of the amplitude measurement unit 92 shown in FIG. 3;

(6) In response to the normal ending of the calibration processing of the tracking error signal, the MPU 14 issues a track servo on command to the DSP to turn on the track servo loop by way of the switch 100; and (7) When on-track is achieved by the track servo on command, the processing is terminated as normal ending.

In this manner, the serious error recovery processing is a process in which, with the assumption that the light beam is put in an unstable state as a result of following the track lateral end portion, the tracking error signal offset and gain are regulated so that the light beam can follow the track center. Similar to the intermediate recovery processing, the on-track is achieved through the return to the location where the track is present after the positioning at the inner side reference location (home position), with recovery to the on-track state by the servo on command.

According to the present invention, as set forth hereinabove, in case the sequential data such as acoustic data or animation data are recorded or regenerated which have the highest priority on the time-sequentially continuous actions, the execution of the calibration is invalidated and suspended till the termination of the regeneration or recording of the sequential data even though the calibration operative conditions have been satisfied for optimizing the apparatus through the regulation of the variation factors attributable to the temperature and elapsed time. Thus, the calibration processing comes to a halt during the recording or regeneration of the sequential data, so that the sequential data processing is suspended in the recording or regeneration of the animation data using the recording apparatus, whereupon the occurrence can be prevented of the buffer overrun, i.e., the buffer becoming filled with stored data, which may cause lost frames or of the buffer underrun, i.e., shortage of data to be read on the buffer, which may cause delayed read due to delayed arrival of the next frame. It is thus possible to suitably execute the calibration for regulating the apparatus variance factors without impairing the sequential data recording or regeneration capabilities. Furthermore, also as to the calibration executed in the error recovery for the occurrence of errors during the recording or regeneration, the temporary invalid flag is set for the sequential data recording or regeneration to suspend the execution of the calibration, thereby making it possible to securely prevent the occurrence of abnormality in the processing attributable to the suspension of the sequential data recording or regeneration for the duration equal to the sum of the recovery processing time and the calibration time.

Although the present invention is effective especially for the optical storage medium taking more time for the calibration, it will be applicable to the other magnetic storage media. It will be appreciated that the present invention is not limited to the above embodiments but may variously be modified without impairing the objects and advantages of the present invention and that those modifications and variants should not be excluded from the scope of the present invention. The present invention is not restricted by the numerical values indicated in the above embodiments.

What is claimed is:

1. A storage apparatus comprising:
    a calibration processing unit for executing a calibration when predetermined operative conditions are satisfied; and
    a calibration invalidation unit for temporarily invalidating execution of said calibration if said calibration operative conditions are satisfied during processing of sequential data, said calibration invalidation unit permitting the execution of said calibration after termination of said sequential data processing.

2. The storage apparatus according to claim 1, wherein said calibration invalidation unit includes a sequential data judgment unit for judging whether sequential data are being processed, said sequential data judgment unit making a judgment that said sequential data are being processed if recording or regeneration continues for a predetermined period of time and if a regeneration or recording track on a medium is continued.

3. The storage apparatus according to claim 2, wherein said sequential data judgment unit makes a judgment that said sequential data are being processed if a sequential data processing mode is set.

4. The storage apparatus according to claim 1, wherein said calibration processing unit makes a judgment that said calibration operative conditions have been satisfied in cases where the apparatus temperature variance on a predetermined time basis exceeds a predetermined value, where the elapsed time after loading of a medium exceeds a predetermined time, or where the seek error count exceeds a predetermined value.

5. The storage apparatus according to claim 1, further comprising:
    an error recovery processing unit which, upon the occurrence of an error, makes a recovery to cancel the error and thereafter makes a retry, said error recovery processing unit executing calibration processing when said error recovery is normally terminated;
    upon the execution of said calibration processing by said error recovery processing unit, said calibration invalidation unit temporarily invalidating the execution of said calibration if processing of sequential data is in process, said calibration invalidation unit permitting the execution of said calibration after the termination of said sequential data processing.

6. The storage apparatus according to claim 5, wherein said error recovery processing unit classifies errors which have occurred, into a serious error, an intermediate error and a light error,
    when a serious error occurs, said error recovery processing unit executing serious error recovery processing,
    when a light error occurs or when said serious error recovery processing is normally terminated, said error recovery processing unit executing light error recovery processing,
    when said light error recovery processing is normally terminated, said error recovery processing unit executing calibration processing if predetermined calibration operative conditions are satisfied,
    when said intermediate error recovery processing is normally terminated, said error recovery processing unit compulsorily executing said calibration processing without judging said calibration operative conditions, and wherein
    said calibration invalidation unit temporarily invalidates execution of said calibration if processing of sequential data is in process, said calibration invalidation unit allowing the execution of said calibration after termination of said sequential data processing.

7. The storage apparatus according to claim 5, wherein said error recovery processing unit classifies errors which have occurred, into a serious error, an intermediate error and a light error, when a serious error occurs, said error recovery processing unit executing serious error recovery processing, when a light error occurs or when said serious error recovery processing is normally terminated, said error recovery processing unit executing light error recovery processing, when said light error recovery processing is normally terminated, said error recovery processing unit executing calibration processing if predetermined calibration operative conditions are satisfied, when said light error recovery processing is normally terminated, said error recovery processing unit compulsorily-executing said calibration processing without judging said calibration operative conditions, and wherein said calibration invalidation unit temporarily invalidates execution of said calibration if processing of sequential data is in process, said calibration invalidation unit allowing the execution of said calibration after termination of said sequential data processing.

8. A method of calibrating a storage apparatus, comprising the steps of:

a calibration processing step for executing a calibration when predetermined operative conditions are satisfied; and a calibration invalidation step for temporarily invalidating execution of said calibration if said. calibration operative conditions are satisfied during processing of sequential data, said calibration invalidation step including permitting the execution of said calibration after termination of said sequential data processing.

9. The method according to claim 8, wherein said calibration invalidation step comprises a sequential data judgment step for judging whether sequential data are being processed, said sequential data judgment step including making a judgment that said sequential data are being processed if recording or regeneration continues for a predetermined period of time and if a regeneration or recording track on a medium is continued.

10. The method according to claim 9, wherein said sequential data judgment step includes making a judgment that said sequential data are being processed if a sequential data processing mode is set.

11. The method according to claim 8, wherein said calibration processing step includes making a judgment that said calibration operative conditions have been satisfied in cases where the apparatus temperature variance on a predetermined time basis exceeds a predetermined value, where the elapsed time after loading of a medium exceeds a predetermined time, or where the seek error count exceeds a predetermined value.

12. The method according to claim 8, further comprising the step of:

an error recovery processing step for, upon the occurrence of an error, making a recovery to cancel the error and thereafter makes a retry, said error recovery processing step including executing calibration processing when said error recovery is normally terminated;

said calibration invalidation step including, upon the execution of said calibration processing in said error recovery processing step, temporarily invalidating the execution of said calibration if processing of sequential data is in process, and permitting the execution of said calibration after the termination of said sequential data processing.

13. The method according to claim 12, wherein said error recovery processing step includes classifying errors which have occurred, into a serious error, an intermediate error and a light error, executing serious error recovery processing when a serious error occurs, executing light error recovery processing when a light error occurs or when said serious error recovery processing is normally terminated, executing calibration processing if predetermined calibration operative conditions are satisfied when said light error recovery processing is normally terminated, and compulsorily executing said calibration processing without judging said calibration operative conditions when said intermediate error recovery processing is normally terminated, and wherein said calibration invalidation step includes temporarily invalidating execution of said calibration if processing of sequential data is in process and permitting the execution of said calibration after termination of said sequential data processing.

14. The method according to claim 12, wherein said error recovery processing step includes classifying errors which have occurred, into a serious error, an intermediate error and a light error, executing serious error recovery processing when a serious error occurs, executing light error recovery processing when a light error occurs or when said serious error recovery processing is normally terminated, executing calibration processing if predetermined calibration operative conditions are satisfied when said light error recovery processing its normally terminated, and compulsorily executing said calibration processing without judging said calibration operative conditions when said light error recovery processing is normally terminated, and wherein said calibration invalidation step includes temporarily invalidating execution of said calibration if processing of sequential data is in process and permitting the execution of said calibration after termination of said sequential data processing.

* * * * *

UNITED STATES PATENT AND TRADEMARK OFFICE
CERTIFICATE OF CORRECTION

PATENT NO. : 6,697,310 B1
DATED : February 24, 2004
INVENTOR(S) : Kuriuzawa et al.

It is certified that error appears in the above-identified patent and that said Letters Patent is hereby corrected as shown below:

Column 15,
Line 13, delete "compulsorily-executing" and insert -- compulsorily executing --.
Line 27, delete "said." and insert -- said --.

Column 16,
Line 43, delete "its" and insert -- is --.

Signed and Sealed this

Twenty-fourth Day of August, 2004

JON W. DUDAS
*Director of the United States Patent and Trademark Office*